United States Patent [19]
Roe

[11] Patent Number: 5,954,864
[45] Date of Patent: Sep. 21, 1999

[54] FURNITURE POLISH

[76] Inventor: Keith A. Roe, Aristowax Products of Norwich, Green Lane House, Green Lane North, Thorpe End, Norwich, Norfolk, NR13 5BB, United Kingdom

[21] Appl. No.: 09/228,170

[22] Filed: Jan. 11, 1999

Related U.S. Application Data

[63] Continuation-in-part of application No. 09/149,784, Sep. 8, 1998, abandoned.

[30] Foreign Application Priority Data

Sep. 12, 1997 [GB] United Kingdom .................. 9719324
Sep. 16, 1997 [GB] United Kingdom .................. 9719556

[51] Int. Cl.$^6$ ........................................ C09G 1/00
[52] U.S. Cl. ............................................. 106/3; 428/402.2
[58] Field of Search ................................ 106/3; 428/402.2

[56] References Cited

U.S. PATENT DOCUMENTS

| | | | |
|---|---|---|---|
| 4,163,673 | 8/1979 | Dechert | 106/11 |
| 4,354,871 | 10/1982 | Sutton | 106/3 |
| 4,613,646 | 9/1986 | Sandvick | 524/476 |
| 4,732,612 | 3/1988 | Steer et al. | 106/10 |
| 4,844,885 | 7/1989 | Chernack | 424/61 |
| 4,908,233 | 3/1990 | Takizawa et al. | 26/534 |

*Primary Examiner*—Anthony Green
*Attorney, Agent, or Firm*—Edwin D. Schindler

[57] ABSTRACT

A furniture polish including a conventional active polishing ingredient is provided with a fragrance micro-encapsulated in a plurality of naturally self-adhesive microcapsules of varying wall thicknesses. The microcapsules may be produced by a wide variety of encapsulation methods generally known to various technical arts, including a coacervation, three-phase method.

12 Claims, No Drawings

FURNITURE POLISH

CROSS-REFERENCE TO RELATED APPLICATION

This is a continuation-in-part of application Ser. 09/149,784, filed Sep. 8, 1998, now abandoned.

BACKGROUND OF THE INVENTION

Technical Field of the Invention

The present invention relates to an improved furniture polish.

SUMMARY OF THE INVENTION

In a preferred embodiment of the present invention, there is provided a furniture polish incorporating a fragrance, with at least a portion of the fragrance of the furniture polish being encapsulated in a plurality of naturally, self-adhesive microcapsules of varying wall thicknesses.

The microcapsules of the present invention may be produced by a wide variety of encapsulation methods generally known to various technical arts. One particularly preferred method for producing the microcapsules for use in the present invention would be the coacervation, three-phase method.

Microencapsulation can best be described as a packaging technique which involves putting minute particles of a solid, or droplets of a liquid, into tiny capsules. In the 1930's, the technique of coacervation was developed, in which it was discovered that, under certain conditions, a colloid (e.g., a gluey substance such as gelatin) dispersed in a liquid to form two separate phases would form a thin wall around any third phase that was present.

Microencapulated products may be made by a batch process comprising three steps carried out under continuous agitation. The first step is the formation of three immiscible phases; a liquid carrier phase, a coating phase and a core material phase. The coating material is dissolved in the liquid carrier and the liquid or solid core material is dispersed in the resulting solution. Coacervation, the second step, is then induced by a change in temperature or pH value to form a three-phase system. Once the coacervated coating phase is formed, it proceeds to concentrate and build up at the surface of the (ore material. Adsorption (i.e., the taking up of one substance on the surface of another) continues until all of the coating phase is wrapped around the core material particles. The final step involves solidification of the coating material by a chemical reaction. The capsules can now be dried to a free flowing powder or directly used as a slurry in the carrier liquid. This procedure allows capsule properties, such as size, wall thickness and permeability to be varied over a fairly wide range by a careful control of the process and choice of materials.

The present invention is focused upon the fact that a large plurality of microcapsules incorporating a fragrance and having varying wall thicknesses (relative to one another) are incorporated in the furniture polish. In this manner, the fragrance is repetitively released, for example, on further use of a duster carrying the polish or rubbing over of a previously polished item of furniture.

In a preferred embodiment of the present invention, the entire amount; of the fragrance contained within the furniture polish is held within the microcapsules of the polish (i.e., preferably, no portion of the fragrance of the furniture polish is simply contained in the polish itself, but not otherwise encapsulated.)

Further, it is also an embodiment of the present invention to provide that a portion (i.e., some percentage less than 100% of the entire amount of active polish ingredient of the furniture polish itself) of a conventionally known active polishing ingredients) contained in the entire furniture polish composition of the invention is also contained in a microencapsulated form. Though, it is likewise within the scope of the invention to simply provide that the active polishing ingredient is conventionally incorporated into the furniture polish, per se, i.e., that none of the active polishing ingredient is provided in a microencapsulated form.

Conventional polishing agents known to the art are disclosed, for example, in Kokoszka et al., U.S. Pat. No. 3,836,371; Lockhart et al., U.S. Pat. No. 3,393,078; Mackles, U.S. Pat. No. 3,395,028; Ohlhausen, U.S. Pat. No. 3,579,540; Liebowitz et al., U.S. Pat. No. 4,013,475; Gilcinski et al., U.S. Pat. No. 4,265,663; Requejo, U.S. Pat. No. 4,689,168; Randen et al., U.S. Pat. No. 5,085,695 (which discloses a wax-free cleaner-polisher composition which contains silicone oil and/or mineral oil and a fluoroalkyl polymer); Miller, U.S. Pat. No. 5,112,394; Wisniewski, U.S. Pat. No. 5,397,384; Lohr et al., Pat. No. 5,681,377; Hansen, U.S. Pat. No. 5,399,282; Lohr et al., U.S. Pat. No. 5,681,377; and, Burke et al., U.S. Pat. No. 5,753,607, the furniture polishing ingredients of which shall hereby be deemed to be incorporated by reference herein.

The furniture polish of the present invention is, preferably, contained in a conventional aerosol, trigger spray or pump-spray container.

Accordingly, by providing a furniture polish comprising therein a fragrance, wherein at least some percentage of the entire amount of fragrance contained within the entire amount of furniture polish is provided in a microencapsulated form, in which a very large plurality of naturally, self-adhesive microcapsules of vary wall thicknesses, relative to one another, exist in the furniture polish, it becomes possible that, upon a first application of the furniture polish with a duster, only some (but not all) of the microcapsules containing the fragrance (and optionally, an active polishing ingredient) will be fractured, with the many of the rest becoming attached to the fibers of the duster. On subsequent use of the duster, even without an additional application of more furniture polish, at least some of the microcapsules attached to the duster are caused to fracture to release further fragrance (and, optionally, an active polishing ingredient, if such is also, at least partially, contained within the furniture polish in a microencapsulated form.)

When, in this further aspect of the present invention, the furniture polish is applied as a spray, thinner-walled microcapsules will fracture to release fragrance (optionally, the conventional, active polishing ingredient that is contained in microencapsulated form, if any) due to the passage through the spray nozzle.

DESCRIPTION OF THE PREFERRED EMBODIMENTS

The present invention will now be further described with reference to the following examples. It should, however, be noted that the examples provided are intended to explain only certain embodiments of the claimed invention and are not intended as a means for defining the limits and scope of the invention.

EXAMPLE 1

Microcapsules containing a furniture polish fragrance and a conventional active polishing ingredient (with a portion of the active polishing ingredient, relative to the entire amount of active polishing ingredient being contained in the entire furniture polish) are formed by the known coacervation, three-phase method, previously detailed herein. This method of production is controlled so that the micro-capsules have an average diameter in the range of 3–30 microns, preferably in the range of 4–16 microns, and most preferably of about 5 microns, and are of varying wall thicknesses.

The microcapsules are incorporated into the furniture polish base, which base may itself contain a conventional active polishing ingredient(s), to form a substantially uniform suspension therein. The furniture polish system of the present invention is then filled into a spray container.

When the furniture polish is used, only some of the microcapsules fracture on passage through the spray nozzle, to enable polishing with a duster accompanied by the release of the fragrance. Thicker-walled microcapsules become entrapped on the fibers of the duster, where they will harden and tend to become brittle over time, so that when the duster is next used, without a further application of polish, further fragrance and active polish ingredient are released due to the friction generated by the polishing action with the duster.

EXAMPLE 2

All fragrance is incorporated into the furniture polish as microcapsules. Slurry containing microcapsules is included in the total product mix at a level of 2.0 percent by weight. The perfume loading in the individual capsules is 50% by weight and the microcapsules have a mean diameter of the order of 5 microns. The wall material of the micro-capsules is made of a copolymer, with thicknesses varying in the range of 2–10% of the mean diameter.

EXAMPLE 3

Fragrance is partially incorporated into the furniture polish of the invention as microcapsules, and partially incorporated into the polish base outside of a micro-encapsulated form. Neat perfume is incorporated in the total product mix at a level of 0.5% by weight. Microencapsulated slurry (perfume loading, capsule six and wall thickness range as in Example 1) is also included in the product mix, at a level of 1.0% by weight.

While only several embodiments of the present invention have been shown and described, it will be obvious to those skilled in the art that many modifications may be made to the present invention without departing from the spirit and scope thereof.

What is claimed is:

1. A furniture polish comprising:

an active polishing ingredient; and, a fragrance micro-encapsulated in a plurality of naturally self-adhesive microcapsules of varying wall thicknesses, said microcapsules being mixed with the active polishing ingredient.

2. The furniture polish according to claim 1, wherein said microcapsules are produced by a coacervation, three-phase method.

3. The furniture polish according to claim 1, wherein 100% of said fragrance incorporated into the furniture polish is encapsulated in the plurality of said naturally self-adhesive microcapsules.

4. The furniture polish according to claim 1, wherein less than 100% of said fragrance incorporated into the furniture polish is encapsulated in the plurality of said naturally self-adhesive microcapsules.

5. The furniture polish according to claim 1, wherein said fragrance is approximately 50%, by weight, of said microcapsules.

6. The furniture polish according to claim 1, wherein said fragrance is approximately 0.5%, by weight, of the furniture polish.

7. The furniture polish according to claim 1, wherein said microcapsules have a mean diameter of 3–30 microns.

8. The furniture polish according to claim 1, wherein said microcapsules have a mean diameter of 5 microns.

9. The furniture polish according to claim 1, wherein said varying wall thicknesses of said microcapsules varies within a range of 2–10% of the mean diameter of said microcapsules.

10. The furniture polish according to claim 1, wherein the furniture polish is contained in an aerosol container.

11. The furniture polish according to claim 1, wherein the furniture polish is contained in a trigger spray container.

12. The furniture polish according to claim 1, wherein the furniture polish is contained in a pump spray container.

* * * * *